US010255293B2

(12) United States Patent
Zhu et al.

(10) Patent No.: US 10,255,293 B2
(45) Date of Patent: Apr. 9, 2019

(54) GENERATING VIRTUAL MAP TILES ACCORDING TO AN AD HOC SPECIFICATION (71) Applicant: ORACLE INTERNATIONAL CORPORATION, Redwood Shores, CA (US)

(72) Inventors: Honglei Zhu, Shrewsbury, MA (US); Liujian Qian, Lancaster, MA (US); Siva Ravada, Nashua, NH (US)

(73) Assignee: ORACLE INTERNATINOAL CORPORATION, Redwood Shores, CA (US)

(*) Notice: Subject to any disclaimer, the term of this patent is extended or adjusted under 35 U.S.C. 154(b) by 0 days.

(21) Appl. No.: 15/172,196

(22) Filed: Jun. 3, 2016

(65) Prior Publication Data

US 2017/0108347 A1    Apr. 20, 2017

Related U.S. Application Data (60) Provisional application No. 62/242,956, filed on Oct. 16, 2015.

(51) Int. Cl.
*G01C 21/32* (2006.01)
*G06F 17/30* (2006.01)

(52) U.S. Cl.
CPC ....... *G06F 17/30241* (2013.01); *G01C 21/32* (2013.01)

(58) Field of Classification Search
None
See application file for complete search history.

(56) References Cited

U.S. PATENT DOCUMENTS

| 2003/0126231 | A1* | 7/2003 | Jang | H04L 29/06 709/218 |
| 2008/0114543 | A1* | 5/2008 | Vishnu | G01C 21/20 701/533 |
| 2013/0076784 | A1* | 3/2013 | Maurer | G01C 21/367 345/629 |
| 2014/0344296 | A1* | 11/2014 | Chawathe | G06F 17/30241 707/755 |
| 2017/0308549 | A1* | 10/2017 | Sims | G06F 17/30241 |

* cited by examiner

*Primary Examiner* — Rami Khatib
(74) *Attorney, Agent, or Firm* — Kraguljac Law Group, LLC (57) ABSTRACT Computerized systems, methods, and other embodiments associated with generating virtual map tiles according to an ad hoc specification are described. In one embodiment, a method includes defining, in response to receiving a request through an interface of a map server, virtual map tiles according to an ad hoc specification. The ad hoc specification indicates characteristics of the virtual map tiles including at least a format and map content of the virtual map tiles. The method includes computing the virtual map tiles from at least the map content specified by the ad hoc specification and according to the format indicated by the ad hoc specification. Computing the virtual map tiles includes computing the virtual map tiles in response to receiving the request. The method includes transmitting the virtual map tiles to a client device to cause the viewable region of the electronic map to be displayed on the client device.

20 Claims, 6 Drawing Sheets

FIG. 1

Ad Hoc Specification 200

Virtual Tile Layer Display Specification

- Map spatial reference system and Data boundaries
- Tile image width and height
- Scale series
- Data layer (or theme) list:

- List of Spatial and Non-spatial data layers
  - Additional conditions for filtering data from data layers Virtual Tile Layer Rendering Specification

- Rendering Requirements
- Rendering Styles: symbol types, color, patterns, annotations, etc.
- Specific Symbols list

```
Ad Hoc Specification 500
┌─────────────────────────────────────────────────────────────────────┐
│ <map_request width="256" height="256" datasource="MVDEMO">          │  ← 505
│ <box srsName="EPSG:4326">                                           │
│ <coordinates>-84.375,39.375,-78.75,45</coordinates></box>           │
└─────────────────────────────────────────────────────────────────────┘
<themes><theme name="THEME_JDBC_STATES">
<jdbc_query datasource="mvdemo" spatial_column="geom" jdbc_srid="8307">
select totpop, poppsqmi, state, state_abrv, geom from states
</jdbc_query>
<rendering><style name="mycolor1"/></rendering>
</theme>
<theme name="THEME_JDBC_COUNTIES">                                       ← 515
<jdbc_query datasource="mvdemo" spatial_column="geom" jdbc_srid="8307">
select totpop,poppsqmi, county, state_abrv, geom from counties</jdbc_query>
<rendering><style name="my_adv_buckets" value_columns="totpop"/></rendering></theme>
┌─────────────────────────────────────────────────────────────────────┐
│ <theme name="THEME_JDBC_CITIES">                                    │  ← 540
│ <jdbc_query datasource="mvdemo" spatial_column="location" jdbc_srid="8307" label_column="city"
│ label_style="myCityLabel">
│ select location, city, state_abrv, pop90, rank90 from cities_us</jdbc_query>
│ <rendering><style name="myCityCircle" value_columns="city"/></rendering>
│ </theme>
└─────────────────────────────────────────────────────────────────────┘
</themes>
<styles>
<style name="mycolor1"><g class="color" style="stroke:#333333;stroke-opacity:255;fill:#F2EFE9;fill-
opacity:255;"></g></style>
<style name="myc1"><g class="color" style="stroke:#E6CFA2;stroke-opacity:26;fill:#FFE6B4;fill-
opacity:64;"></g></style>
<style name="myc2"><g class="color" style="stroke:#D7AA74;stroke-opacity:26;fill:#EFBD81;fill-
opacity:64;"></g></style>
<style name="myc3"><g class="color" style="stroke:#B77640;stroke-opacity:26;fill:#CB8347;fill-
opacity:64;"></g></style>
<style name="myc4"><g class="color" style="stroke:#A21B00;stroke-opacity:26;fill:#B41E00;fill-
opacity:64;"></g></style>
┌─────────────────────────────────────────────────────────────────────┐
│ <style name="my_adv_buckets">                                       │
│ <AdvancedStyle><BucketStyle>                                        │
│ <Buckets default_style="myc2">                                      │  ← 535
│ <RangedBucket seq="0" label="0 - 50,000" low="0" high="50000" style="myc1"/>
│ <RangedBucket seq="1" label="50,000 - 2.5K" low="50000" high="250000" style="myc2"/>
│ <RangedBucket seq="2" label="2.5K - 7.5K" low="250000" high="7500000" style="myc3"/>
│ <RangedBucket seq="3" label="> 7.5K" low="7500000" high="10000000" style="myc4"/>
│ </Buckets>
│ </BucketStyle>
│ </AdvancedStyle>
└─────────────────────────────────────────────────────────────────────┘
</style>                                                                   ← 525
<style name="myCityCircle"><g class="marker" style="stroke:#0000FF;stroke-opacity:204;fill:#FF0000;fill-
opacity:77;width:16;height:16;"><circle cx="8" cy="8" r="0"/></g></style>
<style name="myCityLabel"><g class="text" style="font-style:plain;font-family:Dialog;font-size:12pt;text-
align:center;fill:#0F0F0F"></g>
</style>
</styles>                                                                  ← 530
</map_request>
```

510 — styles block · 520 — my_adv_buckets block

GENERATING VIRTUAL MAP TILES ACCORDING TO AN AD HOC SPECIFICATION

CROSS REFERENCE TO RELATED APPLICATIONS

This disclosure claims the benefit of U.S. Provisional Patent Application Ser. No. 62/242,956 filed Oct. 16, 2015, titled "VIRTUAL TILE LAYERS FOR MAP SERVICES," inventors: Honglei ZHU et al., and assigned to the present assignee.

BACKGROUND

A client device assembles a viewable region of an electronic map by using map tiles requested from a map server. For example, the map tiles are segments or sub-regions of the electronic map that can be pieced together to form the viewable region of the electronic map requested by the client device. In general, the map server defines and generates the map tiles according to an established protocol or specification. This protocol or specification specifies aspects of the map tiles such as map content (e.g., data layers), formatting, and how the map tiles are rendered. The map server is pre-programmed with the protocol/specification such that the map server produces all map tiles according to the specification. Accordingly, the map tiles produced by the particular map server share a specification and, thus, also share the same formatting and map content.

Furthermore, the map server pre-generates the map tiles according to the protocol/specification in a batch process before receiving requests for the map tiles. After pre-generating the map tiles, the map server caches the map tiles in a data store for use when servicing requests from client devices for particular map tiles. In general, generating the map tiles can be a computing intensive task that may take days to complete. Thus, the map tiles are maintained in the cache for weeks or even months without being refreshed because generating the map tiles is such an intensive process that can interrupt availability of the map tiles. However, as the underlying data from which the map tiles are generated changes, the map tiles become out-dated. Thus, a tradeoff between freshness and availability of the map tiles is generally made.

The map server services requests from client devices by simply retrieving requested map tiles from the data store to, at least in part, avoid processing delays from generating the map tiles after receiving the client requests. However, the pre-generated map tiles are numerous and, thus, consume a large amount of storage. Consequently, accommodating storage for the pre-generated map tiles can be burdensome. Furthermore, the pre-generated map tiles are limited to a single format and content defined by the protocol or specification used by the map server when generating the map tiles. Therefore, the map tiles are constrained to formatting and content defined by the protocol/specification, and thus, client devices cannot specify different content or formatting for the map tiles because the map tiles are static.

Additionally, while some map servers may provide map tiles that appear to be dynamically generated (e.g., current traffic maps, weather maps, etc.), the dynamic aspects of the map tiles are not actually provided using dynamically generated map tiles. Instead, for example, a map server uses the same cached map tiles as with a standard map request and also provides raw data (e.g., traffic data) to a requesting client device. The requesting client device is then tasked with rendering the raw data into a displayable form and overlaying the rendered data on top of the pre-generated map tiles to produce the map with additional dynamic content. However, as previously discussed, the pre-generated tiles suffer from problems with out-dated data and an inflexible format. Thus, adding additional data to the pre-generated map tiles does not solve these difficulties but further complicates underlying inaccuracies by overlaying current data onto potentially out-dated data. Additionally, rendering the additional data at the client consumes computing resources of the client device further burdening display of the map tiles.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be implemented as multiple elements or those multiple elements may be implemented as one element. In some embodiments, an element shown as an internal component of another element may be implemented as an external component and vice versa. Furthermore, elements may not be drawn to scale.

FIG. 5 illustrates one embodiment of an ad hoc specification that includes a display specification and a rendering specification.

DETAILED DESCRIPTION

Computerized systems and methods are described herein that provide for generating virtual map tiles on-demand according to ad hoc specifications. As mentioned in the background, a map server may pre-generate map tiles of an electronic map and store the pre-generated map tiles in a cache memory so that the map tiles are available to fulfill incoming requests. Pre-generating the map tiles permits the map server to reply quickly to map tile requests from client devices since the map tiles are simply retrieved from memory and do not need to be generated.

However, the pre-generated map tiles are inflexible since pre-generating the map tiles before receiving a client request constrains the map tiles to content available when the map tiles are pre-generated and to a particular format previously chosen for the map tiles. For example, both content and format of the map tiles are defined according to a previously defined specification/protocol that cannot be altered by a client device at a time of the request since the map tiles are pre-generated. Thus, a client device is limited to requesting the map tiles with the predefined content and format even though a different content and format may be desired.

Additionally, because the map tiles are not generated with data available at a time of the client request, the map tiles may include out-dated data that is no longer accurate. Further difficulties with storing the pre-generated map tiles for complex electronic maps and datasets also detracts from using pre-generated map tiles.

Accordingly, in one embodiment, a computing system services requests for map content on-demand using ad hoc specifications specified in a request by a client device. Thus, the computing system does not service the request using pre-generated map tiles from the cache. Consequently, the map tiles are not static but are instead generated on-demand according to an ad hoc specification. The ad hoc specification is defined in contrast to specifications of an established protocol or another standard for producing map tiles. That is, the ad hoc specification is, for example, specified by a client device and/or a map server and replaces the established protocols/specifications. Thus, a client device may provide a request that specifies an ad hoc specification to cause the map server to compute virtual map tiles dynamically and according to the form and content specified by the ad hoc specification.

Consequently, to fulfill a request for virtual map tiles, the computing system uniquely generates the virtual map tiles on-demand in response to receiving the request. The virtual map tiles are "virtual" in that they are uniquely and dynamically defined according to the ad hoc specification and not according to an otherwise pre-defined (i.e., fixed/static) specification. Accordingly, the computing system dynamically defines and computes the virtual map tiles in response to individual requests. In this way, the computing system dynamically generates the virtual map tiles that form an electronic map to provide for configurable map content.

As a result of dynamically defining and computing the virtual map tiles, map tiles are not, for example, pre-generated and cached. Thus, difficulties associated with managing and storing large data stores of map tiles are avoided. Additionally, dynamically generating the virtual map tiles also avoids difficulties with out-dated content with cached map tiles. Thus, the computing system flexibly generates virtual map tiles to fulfill requests thereby avoiding difficulties associated with pre-generating and caching map tiles.

Figure 1:
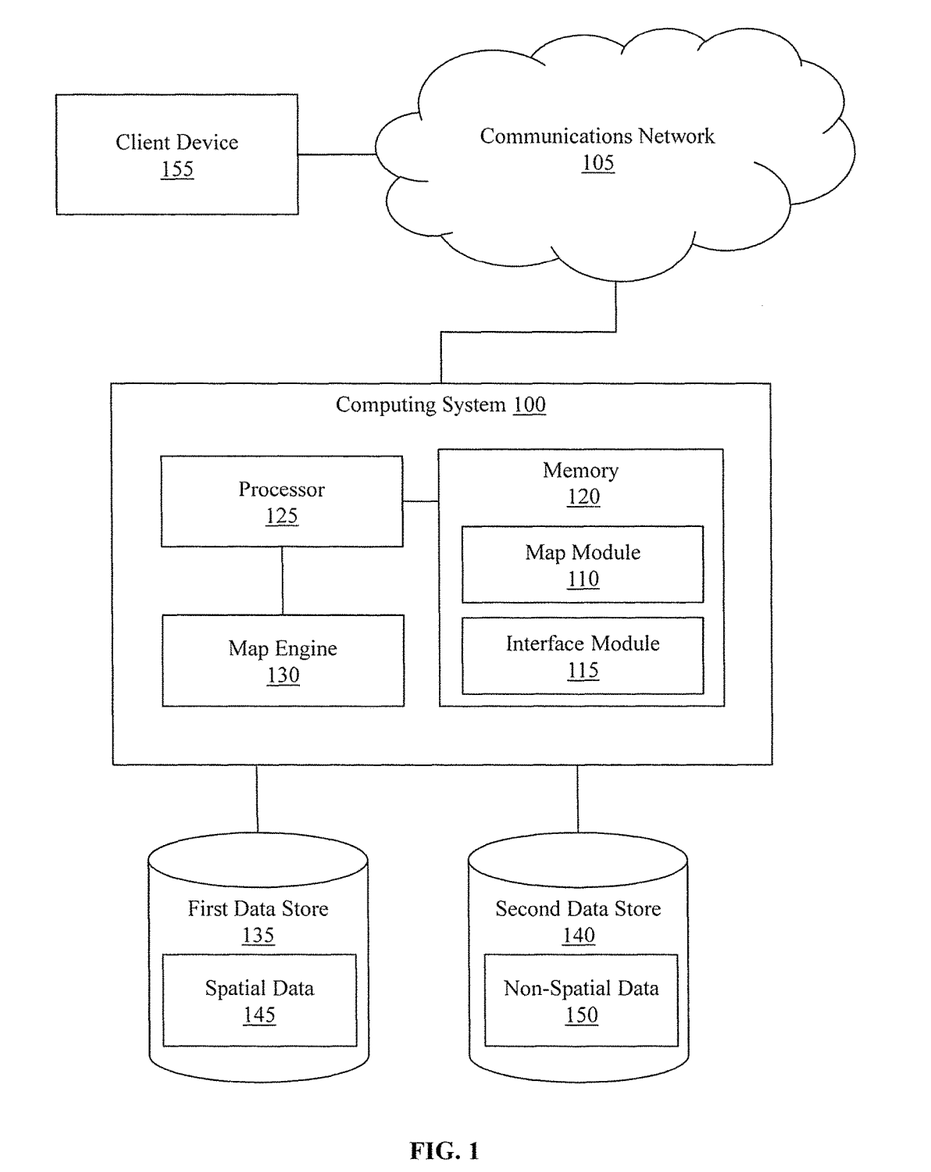
FIG. 1 illustrates one embodiment of a system associated with generating virtual map tiles using ad hoc specifications.

With reference to FIG. 1, one embodiment of a computing system 100 associated with dynamically generating virtual map tiles according to an ad hoc specification is illustrated. In one embodiment, the computing system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment, the computing system 100 is a centralized server-side application that provides at least the computerized functions disclosed herein and that is electronically accessed by many users via computing devices/terminals electronically communicating with the computing system 100 (functioning as the map server) over a computer communications network 105.

FIG. 1 further illustrates the computing system 100 including the processor 125, which is a hardware processing unit, such as, a microprocessor, central processing unit (CPU), application-specific integrated circuit (ASIC), or similar hardware device. The processor 125 is connected via circuitry (e.g., a bus) to the memory 120 and to the first data store 135 and the second data store 140 via one or more input/output controllers. The memory 120 is, for example, a non-transitory memory such as a cache memory of a processor, a flash memory, a random access memory (RAM), or another memory that stores instructions executed by the processor 125 that comprise the map module 110 and the interface module 115. The map module 110 and the interface module 115 are configured with instructions that when executed by at least a processor 125 cause the computing system 100 (e.g., personal computer, server) to perform the corresponding function(s).

Additionally, the first data store 135 and the second data store 140 are, for example, memories such as random access memories (RAM), flash memories, hard-disk drives or similar volatile or non-volatile computer-storage media. Accordingly, the processor 125 uses the data store 135 and 140 to store various data when performing the disclosed functions. As shown in FIG. 1, the first data store 135 and the second data store 140 are separate and distinct storage locations. Of course, in other embodiments, the first data store 135 and the second data store 140 may be combined into a single data store, may be implemented as a single component within the computing system 100 and so on. Additionally, the first data store 135 and the second data store 140 may be remote to the computing system 100 through the communications network 105.

For example, the computing system 100 includes the interface module 115 stored in the memory 120 that is communicably coupled to the processor 125. In one embodiment, the interface module 115 in combination with at least the processor 125 executes one or more computerized routines to expose an interface (not illustrated). The interface is, for example, a port or active link to an application program interface (API) that accepts requests in the form of network communications and provides the requests to the map module 110 which translates the included request for the map engine 130. Thus, the interface module 115 exposes the interface to external devices of the computing system 100 to permit requests from client devices to the map engine 130 for virtual map tiles. By exposing the interface, an ad hoc specification is transferred into the map engine 130 to control the virtual map files.

In one embodiment, the interface module 115 establishes a connection with a client device 155 and receives electronic communications (e.g. a network packet including an electronic map request) from the client device 155 through the interface. Subsequently, the interface transfers the request in the form of the electronic communication to the map module 110. In one embodiment, the map module 110 analyzes the communication to parse an ad hoc specification from the communication and then transforms the ad hoc specification into one or more electronic data structures that are stored in, for example, a first data store 135. Subsequently, the map module 110 signals the map engine 130 using, for example, the exposed interface to provide the ad hoc specification from the communication.

Moreover, in one embodiment, the map module 110 defines and computes virtual map tiles that are electronic data structures that form an electronic map. The map module 110 computes the virtual map tiles according to the ad hoc specification identified by the request. Thus, in response to the ad hoc specification defined in the request, the map module 110 fetches map data from the first data store 135 and/or a second data store 140, defines parameters of virtual map tiles and uses the fetched data to compute the virtual map tiles as new electronic data structures. In one embodiment, the map module 110 accomplishes the noted functions by providing the map data to the map engine 130 and controlling the map engine 130 to render the virtual map tiles according to the ad hoc specification.

Figure 2:
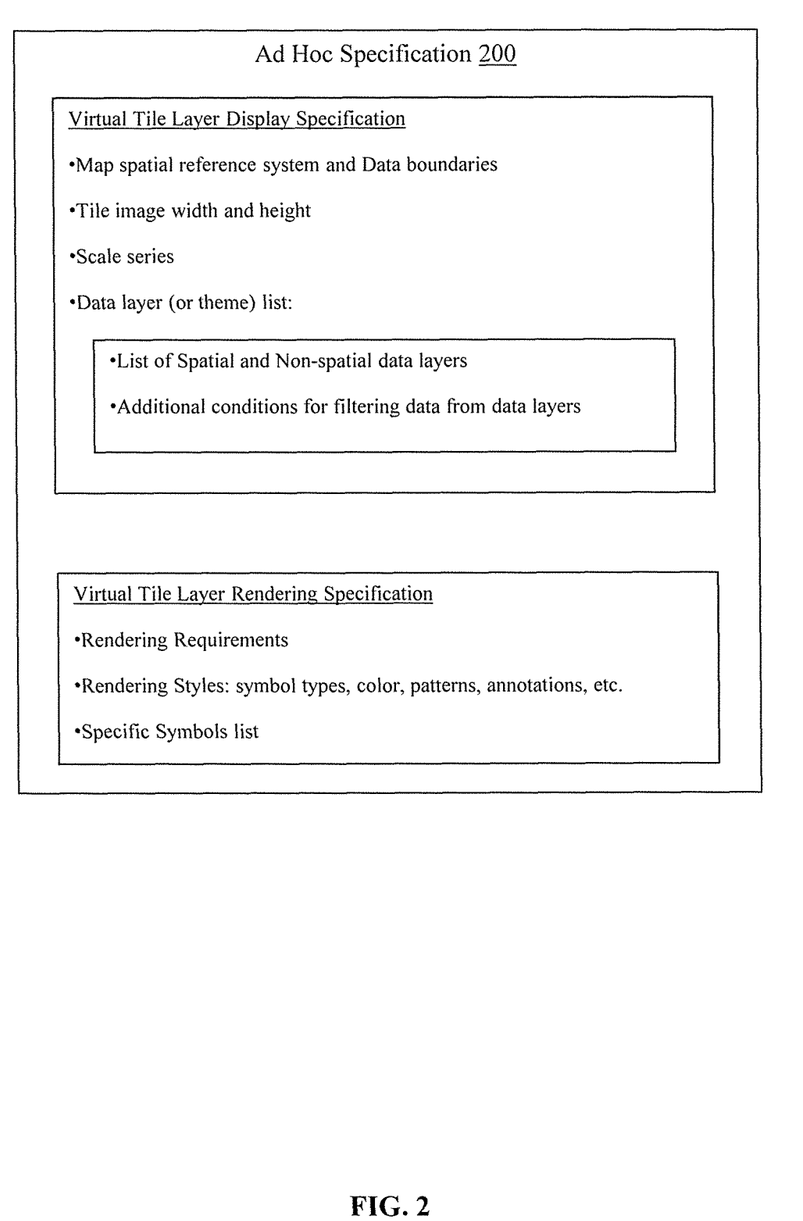
FIG. 2 illustrates one example of an electronic data structure that stores the ad hoc specification for defining and computing virtual map tiles.

In either case, the first data store 135 and the second data store 140 store spatial data 145 and non-spatial data 150, respectively that comprises the content of virtual map tiles that form a viewable region of an electronic map. Before proceeding with a further discussion of the spatial data 145 and the non-spatial data 150, consider FIG. 2. FIG. 2 illustrates an example representation of an electronic data structure for an ad hoc specification 200. The ad hoc specification 200 is one example of a specification used by the computing system 100 to define virtual map tiles. The virtual map tiles are electronic data structures that define subsections of the electronic map. The electronic map is divided into a grid with each grid subsection equating to one virtual map tile. In one embodiment, each separate request specifies a viewable region of the electronic map that is comprised of at least one virtual map tile. In general, the map module 110 analyzes the ad hoc specification from the request to identify the viewable region of the electronic map that has been requested. The viewable region is, for example, an area of the electronic map that is to be displayed in a map viewer.

The map module 110 further determines other aspects of how the virtual map tiles are to be generated including a particular size of each tile (e.g., 256 pixels by 256 pixels) and then divides the viewable region into the virtual map tiles according to the size, zoom level and so on. Thus, the map module 110 determines characteristics for each of the virtual map tiles for fulfilling the request. The map module 110 divides the viewable region of the electronic map into the virtual map tiles to facilitate better managing, computing, transmitting, and displaying requested portions of the electronic map.

With continued reference to FIG. 2, the ad hoc specification 200 defines characteristics of the electronic data structures and how the virtual maps tiles are populated, formatted and rendered. In general, an ad hoc specification as discussed within this disclosure includes two separate parts, a display specification, and a rendering specification. The display specification defines data (i.e., map content) used to generate the virtual map tiles in addition to a formatting of the virtual map tiles. For example, as illustrated along with the ad hoc specification 200, the display specification defines a spatial reference system, data boundaries, tile dimensions, a scale series (i.e., zoom levels) and data layers (i.e., map contents). In general, the display specification not only defines what is included within the virtual map tiles but also how the virtual map tiles are formatted for display.

By contrast, the rendering specification defines rendering requirements/instructions for how to transform spatial and non-spatial data into map symbols/images to deliver information that can be displayed. Thus, the rendering specification defines specific symbols to use for point features (i.e., restaurants and gas stations), how linear features (i.e., roads and rivers) are represented (e.g., line styles, colors, etc.), how polygon boundaries (e.g., political boundaries) are drawn, colors/patterns for different features and so on. Accordingly, the rendering specification generally relates to aspects of how the map module 110 controls the map engine 130 to render features within the individual virtual map tiles.

While the rendering specification is generally discussed as being defined within the ad hoc specification and received with a request, in one embodiment, the rendering specification is defined previously within the computing system 100. For example, an administrator may define the rendering specification for all requests to streamline how the virtual map tiles are defined or as a default when the request does not define the rendering specification. Thus, the rendering specification may be defined before receiving requests and according to, for example, electronic inputs from an administrator or other electronic inputs that uniquely identify elements of the rendering specification.

Furthermore, in one embodiment, the computing system 100 may uniquely define both the display specification and the rendering specification and, thus, service requests according to the ad hoc specification defined by the computing system 100 so that a request does not need to provide the ad hoc specification but still benefits from the virtual map tiles being generated on-demand in response to the request. In either case, the ad hoc specification is a complex electronic data structure that is dynamically defined according to particular characteristics of the virtual map tiles desired by a specific client device. Thus, the ad hoc specification specifies data sources, variables, filters, routines and other information that tailor the virtual map tiles for the client device.

Accordingly, referring back to FIG. 1, the first data store 135 and the second data store 140 electronically store map content. As discussed in relation to FIG. 2, the ad hoc specification indicates specific content to use for generating the virtual map tiles. Accordingly, the map module 110 parses the ad hoc specification and identifies which data layers to fetch when computing the virtual map tiles.

In one embodiment, the virtual map tiles include two separate types of data layers. For example, a virtual map tile includes multiple data layers that may be overlaid or otherwise combined to produce the virtual map tile. The data layers include one or more layers of the spatial data 145 and, in some instances, one or more data layers comprised of the non-spatial data 150. The spatial data 145 includes electronic data such as satellite map images, geographic information relating to locations of geographic features, topology information, digital elevation models (DEM), and so on. More specifically, the spatial data 145 includes data that defines locations within a spatial reference system (e.g., longitude and latitude). By contrast, the non-spatial data 150 includes electronic metadata such as attribute information or characteristic information including tabular or textual electronic data describing different characteristics or features of things. For example, the non-spatial data 150 may include data such as gas prices, real estate prices, a person's height, a person's age, etc. The non-spatial data 150 is generally location independent and, thus, referred to as non-spatial.

As used in this disclosure, the spatial data 145 and the non-spatial data 150 are intended to be broad categories of data that are generally gathered from electronic sources specified by the ad hoc specification for use in generating the virtual map tiles. Consequently, the ad hoc specification identifies specific electronic sources of the spatial data 145 and the non-spatial data 150 that may be either local (e.g., data stores 135 and 140) or remote (e.g., remote electronic information servers and/or databases). In either case, the map module 110 identifies the electronic sources from the ad hoc specification and fetches the electronic data when the virtual map tiles are computed. For example, the map module 110 may query a remote database of spatial data according to a query specified in the ad hoc specification for selecting spatial data to be included in the virtual map tiles. In this way, the map module 110 retrieves, for example, data that is tailored to the virtual map tiles requested by the client device when computing the virtual map tiles dynamically for each request.

Figure 3:
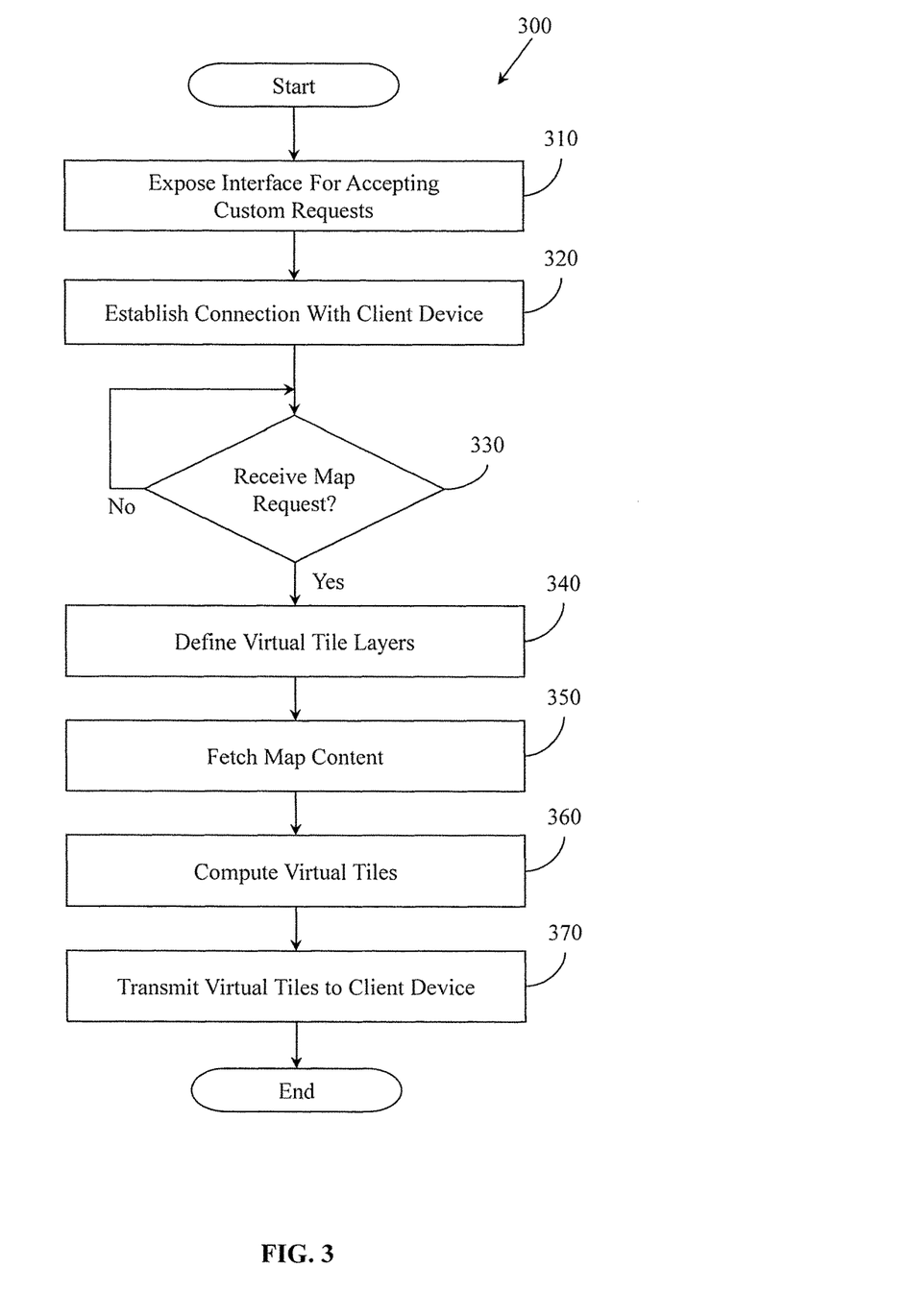
FIG. 3 illustrates one embodiment of a method associated with computing virtual map tiles according to an ad hoc specification.

Further aspects of the virtual map tiles will be discussed in relation to FIG. 3. FIG. 3 illustrates a method 300 associated with generating virtual map tiles according to an ad hoc specification. For purposes of this discussion, method 300 will be discussed from the perspective of the computing system 100 of FIG. 1. However, it should be appreciated that method 300 is not limited to being implemented within the computing system 100, but is discussed from the perspective of the computing system 100 for purposes of explanation.

At 310, an interface is initially exposed to accept custom map requests. In one embodiment, exposing the interface includes providing access to a function call/interrupt, activating the function call/interrupt, and passing communications to the map engine 130 using the function call/interrupt. The interface is, for example, a port, an application interface (e.g., a function call or hook) or another link within the computing system 100 that functionally exposes the map engine 130 via the interface module 115 and the map module 110.

In other words, the interface is a mechanism used by the computing system 100 to receive requests from remote devices (e.g., the client device 155) that are not plain standard requests for cached map tiles. The interface provides the computing system 100 the ability to receive requests for the virtual map tiles that are to be generated specifically to fulfill the requests according to, for example, characteristics that define an ad hoc specification included with the requests.

Accordingly, the interface permits the map module 110 to modify a standard specification within the map engine 130 according to an ad hoc specification and, thus, control how virtual map tiles are generated. In this way, the interface acts as an access pathway to the map engine 130 by which the map module 110 controls operation of the map engine 130 to produce virtual map tiles. Without the interface, the manner by which map tiles are generated is fixed according to a predefined specification (i.e., specifications that are fixed and stored in the map server). Accordingly, exposing the interface, at 310, provides for the map module 110 to use ad hoc specifications to control how the map engine 130 generates virtual map tiles while, for example, maintaining existing functionality of the map engine 130.

After the interface has been exposed, at 320, a connection is established with a client device (e.g., client device 155) using the interface. In one embodiment, establishing the connection includes receiving a request to connect within the computing system 100, authenticating the request, accepting the request, and maintaining a communication pathway with the client device 155. For example, the interface module 115 monitors for connections from client devices that identify the interface. Upon detecting a connection request, the interface module 115, in one embodiment, establishes a connection according to a handshake protocol to exchange information about the connection. Thereafter, the connection is available for communicating with the client device 155.

Additionally, the interface module 115 also identifies whether the connection request is to the interface and, for example, alerts the map module 110 of the connection. In general, a request for virtual map tiles identifies the interface in order to indicate that the request is to be directed to, for example, the map module 110. This is in contrast to, for example, standard map requests that may be received by the computing system 100 for pre-generated map tiles that do not identify the interface or an ad hoc specification for producing map tiles.

At 330, an electronic request for virtual map tiles is received. In one embodiment, receiving the request includes identifying the request, buffering the request, and initiating the map module 110 to handle the request. For example, the interface module 115 monitors communications received in the computing system 100 to identify when a request for virtual map tiles is received. When a request is received, the interface module 115 identifies an ad hoc specification from the request, if included, and, for example, alerts the map module 110. The request is generally discussed herein as including the ad hoc specification, however, in various embodiments, the request may specify both the display specification and the rendering specification, one of the specifications, or neither. Because the virtual map tiles are generated to be tailored for a specific client device, the content of the request is specific to a desired set of virtual map tiles.

In general, the request originates from a map viewer application or other mapping application on the client device 155. For example, the client device 155 is a computing device that executes the map viewer. In one embodiment, the map viewer includes various controls, options, fields that permit specifying aspects of an electronic map that is displayed with the map viewer on a display screen of the client device 155. For example, the map viewer includes configurable zoom levels, fields for specifying data sources and filtering options for the data sources, options for rendering the virtual map tiles and so on. Accordingly, from the configurable inputs of the map viewer, the map viewer generates an ad hoc specification for the electronic map as an electronic data structure. The electronic data structure identifies the custom characteristics and content of the electronic map and is formed into the electronic request that is sent to the computing system 100 over the communications network 105.

Furthermore, the request itself generally includes at least the display specification of the ad hoc specification and may also include the rendering specification depending on how the ad hoc specification is defined by the client device 155. In either case, the request is for virtual map tiles that form a viewable region of the electronic map within the map viewer and are defined according to the ad hoc specification. The viewable region of the electronic map is, for example, of a geographically bounded area defined by the ad hoc specification and may be defined to include many different data layers (e.g., rasterized satellite images, population data, etc.) with formatting (e.g., zoom levels, tile size, etc.) that is also defined according to the ad hoc specification.

Figure 4:
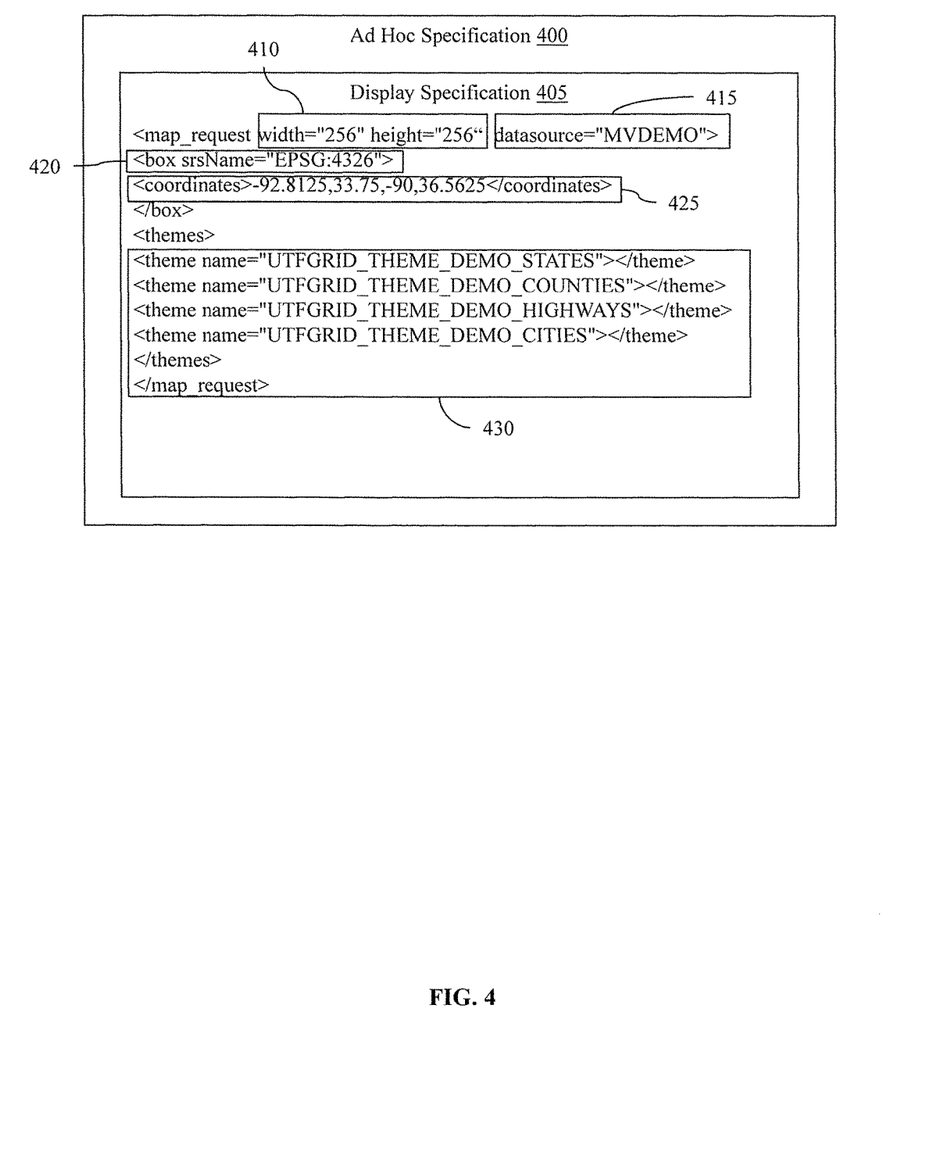
FIG. 4 illustrates one embodiment of an ad hoc specification that includes a display specification.

FIG. 4 illustrates one example of an ad hoc specification 400. The ad hoc specification 400 includes a display specification 405 but does not include a rendering specification. Thus, when the computing system 100 receives the ad hoc specification 400 in a request for virtual map tiles, a server-side rendering specification may be used by default. In either case, the display specification 405 specifies a geometry 410 of the virtual map tiles, a data layer 415, a projection 420, coordinates 425 of a viewable region and themes 430. The geometry 410 indicates a size in pixels of the virtual map tiles as 256 pixels by 256 pixels. The projection 420 indicates a particular style of a map projection to be used for the virtual map tiles. The coordinates 425 specify a viewable region (i.e., bounded rectangle) of the electronic map in longitude and latitude for the present example. The themes 430 specify a selection of available themes for different aspects of displaying the virtual map tiles. The themes 430 indicate selections for how to display states, counties, highways, and cities. For example, the cities theme may use a particular size of circle or dot for cities of different sizes; the highways theme may use a particular color combination for different types of highways, and so on. The themes 430 of the ad hoc specification 400 are selected from defined themes available from the computing system 100.

Of course, the display specification 405 is one example of a display specification and other display specifications may indicate additional or fewer aspects of the display specification. That is, aspects of the ad hoc specification 400 that are not explicitly indicated will be, for example, filled-in by the map module 110 using default specifications. In alternative embodiments, the map module 110 uses the ad hoc specification to modify an existing specification. Thus, the map module 110 replaces and/or adds to existing basic variables/elements of the specification with elements specified in the ad hoc specification.

Furthermore, FIG. 5 illustrates one embodiment of an ad hoc specification 500 that includes both a display specification 505 and a rendering specification 510. The display specification 505 includes elements similar to the display specification 405 of FIG. 4 except that the display specification 505 does not include themes. In the ad hoc specification 500, themes 515 are included as part of the rendering specification 510. Switching between whether a particular element is included in the display specification or rendering specification is illustrated with the ad hoc specification 400 and the ad hoc specification 500. This aspect of the ad hoc specification illustrates how a particular element may be specified at a high-level with the display specification by simply selecting available pre-defined specification elements (e.g., different themes) or at a low-level with the rendering specification by explicitly defining an element (e.g., actually defining aspects within the themes).

For example, the rendering specification 510 indicates the themes 515 and styles 520. The styles 520 indicate how to render particular elements within the themes 515. For example, the styles 520 define separate color and opacity profiles along with a particular scheme for sizes and colors of circles that represent cities. Style 525 specifies colors and opacities for circles that represent cities; style 530 specifies color and font styles for city names; and style 535 specifies colors for counties according to population groups. The styles 525, 530, and 535 are combined into the theme 515 to control how representations of states, counties, and cities are rendered in the virtual map tiles. The themes 515 further illustrates how particular features (e.g., states, counties, and cities) are selected from a database using a particular query for display in the virtual map tiles. Thus, the ad hoc specification 500 illustrates one embodiment of how a client device (e.g., client device 155) can specify how to render and display various elements in the virtual map tiles to tailor the virtual map tiles for different purposes.

With continued reference to FIG. 3 and method 300, at 340, the virtual map tiles of the electronic map are defined using the ad hoc specification. In one embodiment, the map module 110 defines the virtual map tiles by parsing the request to identify values of different aspects of the ad hoc specification for the virtual map tiles, storing the values, reconfiguring the map engine 130 according to the values and generating electronic data structures for storing the virtual map tiles.

In one embodiment, the map module 110 defines the virtual map tiles by indicating map content and a format of the segments that comprise the virtual map tiles. That is, the map module 110, for example, changes values of variables within the map engine 130 such that the map engine 130 alters a manner of computing virtual map tiles. Furthermore, the map module 110 generates electronic data structures according to the ad hoc specification as, for example, containers for the virtual map tiles. In this way, the map module 110 defines a general structure of the virtual map tiles so that the electronic data structures can later be populated according to the ad hoc specification.

As previously noted, the ad hoc specification includes a display specification and a rendering specification. Thus, the map module 110 configures the map engine 130 according to both the rendering specification used to render the virtual map tiles and the display specification used to format and more generally define the virtual map tiles for display. In other words, the map module 110 identifies the scale series (i.e., zoom levels) to the map engine 130 while also configuring the dimensions (i.e., height and width) of the tiles, the data layer content and other relevant information from the ad hoc specification. In this way, the map module 110 defines the virtual map tiles both in format and content and how the virtual map tiles are rendered by the map engine 130.

For example, referring back to the ad hoc specification 400 of FIG. 4, the map module 110 uses the geometry 410, the projection 420 and the coordinates 425 to define the virtual map tiles by deriving the virtual map tiles from the data source 415. In other words, the map module 110 uses the defined parameters 410, 420, and 425 to define the virtual map tiles dynamically over the requested data 415. In one embodiment, the map module 110 defines a grid and allocates data from the data source 415 for each of the virtual map tiles so that each virtual map tile includes the appropriate data. Similarly, with reference to the ad hoc specification 500 of FIG. 5, the map module 110 uses the specified styles and themes to define how the map engine 130 is to render the virtual map tiles and ultimately control how the map engine 130 actually generates elements within the virtual map tiles that form the electronic map itself.

At 350, map content is fetched from one or more sources. In one embodiment, the map module 110 fetches the map content by identifying electronic sources of the map content as indicated by the ad hoc specification, generating requests for the content, providing the requests to the electronic sources, receiving the content, and storing the content. For example, the map module 110 generates requests that are transmitted to the electronic sources identified by the ad hoc specification. Because the map is not predefined with static content and is instead dynamically defined and computed using parameters specified by the ad hoc specification, the first data store 135 and the second data store 140 may not store all of the requested map content (i.e., data layers) specified by the ad hoc specification. Instead, the map module 110 actively requests and retrieves the data layers from remote sources over, for example, the communications network 105. In this way, the computing system 100 dynamically produces maps in response to the ad hoc specification with content that is specified by the ad hoc specification.

Additionally, in one embodiment, the map module 110 filters data from a requested data layer to refine data that is provided as map content. That is, the ad hoc specification, in addition to indicating an electronic source for a data layer, in one embodiment, also indicates filtering criteria. For example, the ad hoc specification may indicate a data layer that includes information about all individuals living within a specified area. Accordingly, the ad hoc specification may further specify specific values (e.g., age, height, smoker/nonsmoker, etc.) to return in relation to each individual. Consequently, the map module 110 creates a query to the source to obtain the filtered data instead of generically retrieving all data from the source. In this way, the map module 110 refines data to be included in the virtual map tiles so that the map module 110 precisely and efficiently computes the virtual map tiles.

For example, with reference again to the ad hoc specification of FIG. 5, the display specification 505 and various aspects of the rendering specification 510 both identify a data source from which to retrieve data for generating the virtual map tiles. Furthermore, the rendering specification 510 includes queries to the data source that are, for example, communicated to the data sources by the map module 110 and operate to filter specific data from the data source for rendering into the virtual map tiles. Additionally, while the data source is specified as a generic "MVDEMO" spatial database in this example, in further embodiments, the data source may be specified using a URL, or another addressable identifier that can be used by the map module 110 to retrieve the data.

At 360, the virtual map tiles of the electronic map are computed. In one embodiment, computing the virtual map tiles includes accessing the fetched data, combining the fetched data together, rendering the virtual map tiles from the combined fetched data, formatting the virtual map tiles, and storing the virtual map tiles in the previously generated electronic data structures. For example, the map module 110 computes the virtual map tiles by causing the virtual map tiles to be generated from the fetched data and as specified by the ad hoc specification using the map engine 130. That is, in one embodiment, the map module 110 computes the virtual map tiles by altering how the map engine 130 generates map tiles.

For example, the map engine 130 is a module executed by the processor 125 that accepts map data along with configuration information (i.e., the ad hoc specification) and generates the virtual map tiles that can be displayed in, for example, a map viewer. However, the map engine 130 generally pre-generates the map tiles according to a pre-defined fixed specification and not on-demand. Thus, the map module 110 alters the operation of the map engine 130 by defining the virtual map tiles using the ad hoc specification in place of a standard protocol for generating map tiles. Accordingly, the map module 110 triggers the map engine 130 to dynamically create the virtual map tiles to comply with the ad hoc specification by replacing an existing standard with the ad hoc specification. Thus, computing the virtual map tiles may include combining different data layers together and formatting the combined data layers to generate virtual map tiles with content and a formatting that is not available when the map engine 130, for example, pre-generates map tiles according to the predefined fixed specification. In this way, the map module 110 uses the interface to manipulate and control operation of the map engine 130 and dynamically and newly compute the virtual map tiles in response to requests.

At 370, the virtual map tiles are transmitted to a client device. In one embodiment, transmitting the virtual map tiles includes packaging the virtual map tiles as payloads of network communications, buffering the network communications, and transmitting the network communications over the interface to the client device. For example, the interface module 115 collects the virtual map tiles and generates a network communication with the virtual map tiles as a payload. The virtual map tiles are then transmitted by the computing system 100 over the communications network 105 to the client device 155.

Furthermore, communicating the virtual map tiles to the client device causes, in one embodiment, the map viewer of the client device 155 to display the virtual map tiles on an associated electronic display. In this way, the electronic map is computed on-the-fly according to the ad hoc specification using the virtual map tiles.

Additionally, while the electronic map and the virtual map tiles are generally discussed as being defined and computed in a single process, of course, in other embodiments, virtual map tiles for subsections of the electronic map are generated as needed and, for example, depending on a presently viewed section of the electronic map by the map viewer. Accordingly, separate sections of the electronic map and corresponding virtual map tiles may be generated subsequently and on an as-needed per request basis.

Thus, present systems, methods, and other embodiments provide up-to-date map tiles for constantly changing source data and provide flexible formatting and content by supporting content filtering and dynamic selection. Additionally, the present systems, methods, and other embodiments provide for improved server maintenance by avoiding data duplication associated with caching map tiles.

Computing Device Embodiment

Figure 6:
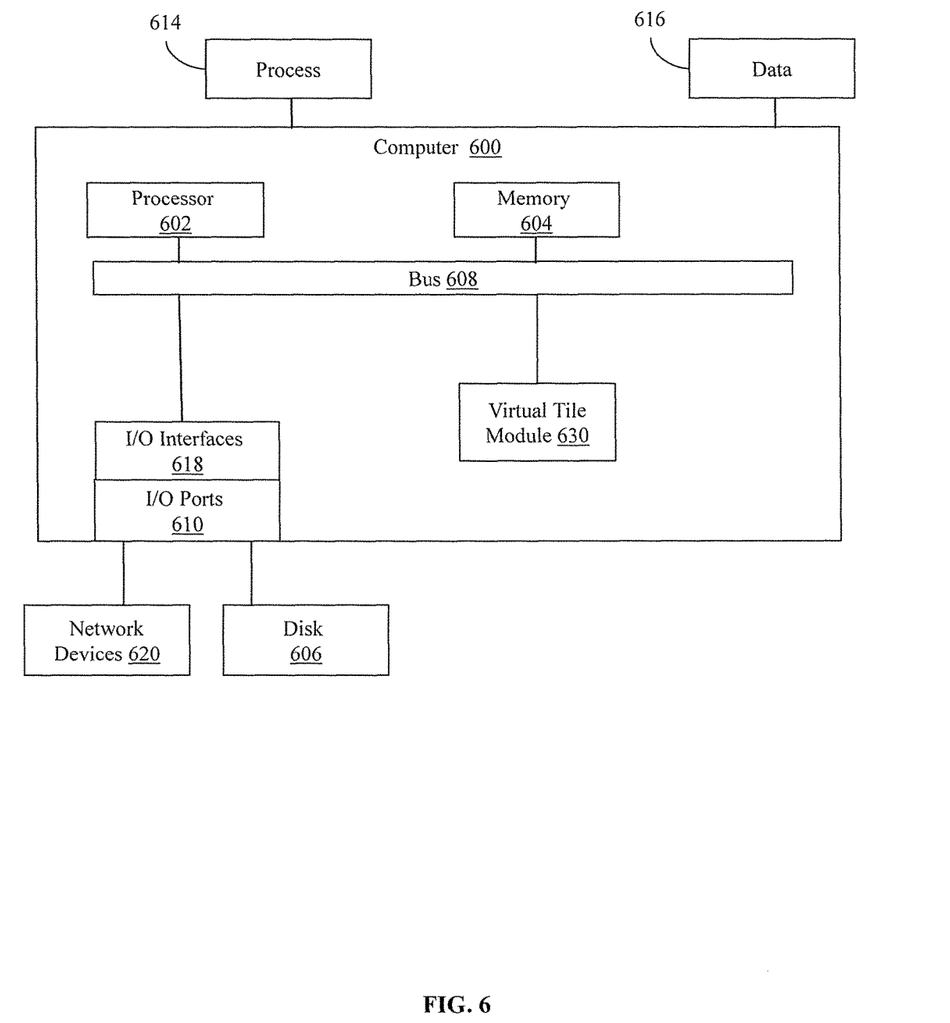
FIG. 6 illustrates an embodiment of a computing system configured with the example systems and/or methods disclosed.

FIG. 6 illustrates an example computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 may include a virtual tile module 630 that includes instructions stored in a non-transitory computer-storage medium which are executable by the processor 602 to expose an interface to a map engine, accept requests for custom electronic maps as defined by an ad hoc specification, define virtual map tiles that segment the electronic maps, compute the virtual map tiles from specified map content on-the-fly in response to the request and transmit the computed virtual map tiles to a request client device over a communications network similar to computing system 100 shown in FIG. 1. In different examples, the virtual tile module 630 may be implemented in hardware, a non-transitory computer-readable medium with stored instructions, firmware, and/or combinations thereof. While the virtual tile module 630 is illustrated as a hardware component attached to the bus 608, it is to be appreciated that in other embodiments, the virtual tile module 630 could be implemented in the processor 602, stored in memory 604, or stored in disk 606.

In one embodiment, virtual tile module 630 or the computer is a means (e.g., structure: hardware, non-transitory computer-readable medium, firmware) for performing the actions described. In some embodiments, the computer 600 may be a server operating in a cloud computing system, a server configured in a Software as a Service (SaaS) architecture, a smartphone, laptop, tablet computing device, and so on.

The means may be implemented, for example, as an ASIC programmed to dynamically define virtual map tiles according to provided custom specifications and compute the virtual map tiles on-the-fly in response to electronic requests received over a network for an electronic map. The means may also be implemented as stored computer executable instructions that are presented to computer 600 as data 616 that are temporarily stored in memory 604 and then executed by processor 602.

Virtual tile module 630 may also provide means (e.g., hardware, non-transitory computer-readable medium that stores executable instructions, firmware) for generating electronic data structures that define and store the virtual map tiles in addition to electronically transmitting the virtual map tiles to one or more requesting client devices.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output (I/O) interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD-ROM, and so on. The memory 604 can store a process 614 and/or a data 616, for example. The disk 606 and/or the memory 604 can store an operating system that controls and allocates resources of the computer 600.

The computer 600 may interact with input/output (I/O) devices via the I/O interfaces 618 and the input/output ports 610. Input/output devices may be, for example, a keyboard, a microphone, a pointing, and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the I/O interfaces 418, and/or the I/O ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer-executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smartphone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term, and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium," as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read-only memory (ROM), a memory chip or card, a memory stick, solid-state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

An "operable connection", or a connection by which entities are "operably connected," is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User," as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both." When the applicants intend to indicate "only A or B but not both" then the phrase "only A or B but not both" will be used. Thus, use of the term "or" herein is the inclusive and not the exclusive use.

What is claimed is:

1. A non-transitory computer-readable medium storing instructions that when executed by one or more processors cause the one or more processors to perform at least:
   in response to receiving a request for a portion of an electronic map, from a client device through an interface of a map server, parsing the request to identify an ad hoc specification as part of the request, wherein the ad hoc specification is a custom specification to the request and includes characteristics of virtual map tiles for forming the portion of the electronic map;
   parsing the ad hoc specification identified as part of the request: (i) to identify a display specification that defines map content used to generate virtual map tiles and a format of the virtual map tiles, and (ii) to identify a rendering specification that defines rendering instructions to transform spatial and non-spatial data into map symbols and images to be displayed;
   defining virtual map tiles that form a viewable region of the electronic map according to the ad hoc specification including at least the format and the map content identified as part of the request from at least one of the display specification and the rendering specification;
   fetching, by the map server, the map content from one or more data sources indicated by the ad hoc specification in the request;
   computing and generating, by the map server, the virtual map tiles from at least the fetched map content and according to the format indicated by the ad hoc specification;
   executing the rendering instructions from the rendering specification to transform the spatial and the non-spatial data in the virtual map tiles into the map symbols and the images according to the rendering specification;
   wherein the virtual map tiles are generated on-demand in response to receiving the request and the ad hoc specification; and
   transmitting, via network communications, the virtual map tiles to the client device to cause the viewable region of the electronic map to be displayed on the client device.

2. The non-transitory computer-readable medium of claim 1, wherein the instructions for fetching the map content further comprise instructions that when executed by the one or more processors cause the one or more processors to perform at least:
   fetching the map content including separate data layers of the virtual map tiles as indicated by the ad hoc specification, wherein the data layers include one or more layers of spatial data and one or more layers of non-spatial data, and wherein fetching the map content includes filtering data from at least one of the data layers to generate refined data as one of the data layers of the electronic map.

3. The non-transitory computer-readable medium of claim 1, wherein the instructions further comprise instructions that when executed by the one or more processors cause the one or more processors to perform at least:
   exposing the interface within the map server to accept real-time requests to the map server that cause the virtual map tiles to be dynamically created according to the ad hoc specification, wherein exposing the interface provides access to a map engine of the map server for computing the virtual map tiles using the ad hoc specification,
   wherein the ad hoc specification causes the map engine to generate the virtual map tiles that form the viewable region of the electronic map without using previously cached map tiles.

4. The non-transitory computer-readable medium of claim 1, wherein transmitting the virtual map tiles to the client device causes the client device to display the virtual map tiles in a map viewer that originated the request.

5. The non-transitory computer-readable medium of claim 1, wherein the rendering specification specifies instructions for transforming the map content into the virtual map tiles, and wherein the display specification specifies how to divide the map content into the virtual map tiles.

6. The non-transitory computer-readable medium of claim 5, wherein the rendering specification is defined by the map server as a default for how to render the virtual map tiles when the request does not include the rendering specification, and wherein the display specification is defined within the request from the client device.

7. The non-transitory computer-readable medium of claim 1, wherein computing the virtual map tiles includes rendering raster images as at least one layer of the virtual map tiles and combining the raster images with additional data layers of the map content to form the virtual map tiles, and wherein the additional data layers include spatial data or non-spatial data.

8. The non-transitory computer-readable medium of claim 1, wherein the instructions further comprise instructions that when executed by the one or more processors cause the one or more processors to perform at least:
   establishing a connection with the client device over a network to connect the client device with the interface; and
   receiving, in the map server, the request that identifies at least a part of the ad hoc specification for defining the virtual map tiles of the viewable region of the electronic map.

9. The non-transitory computer-readable medium of claim 1, wherein the ad hoc specification replaces a standard specification that is defined according to a protocol, and wherein defining the virtual map tiles using the ad hoc specification causes the map server to compute the virtual map tiles on-demand for each request without using pre-generated map tiles from a cache.

10. A computing system, comprising:
one or more processors;
a memory connected to the processor, wherein the memory stores:
a map module including instructions that when executed by the one or more processors cause the one or more processors to perform at least:
(i) in response to receiving a request for a portion of an electronic map, from a client device through an interface of a map server, parsing the request to identify an ad hoc specification as part of the request, wherein the ad hoc specification is a custom specification to the request and includes characteristics of virtual map tiles for forming the portion of the electronic map;
(ii) parsing the ad hoc specification identified as part of the request (i) to identify a display specification that defines map content used to generate virtual map tiles and a format of the virtual map tiles, and (ii) to identify a rendering specification that defines rendering instructions to transform spatial and non-spatial data into map symbols and images to be displayed;
(iii) defining virtual map tiles that form a viewable region of the electronic map according to the ad hoc specification including at least the format and the map content identified as part of the request from at least one of the display specification and the rendering specification;
(iv) fetching, by the map server, the map content from one or more data sources indicated by the ad hoc specification in the request;
(v) computing and generating, by the map server, the virtual map tiles from at least the fetched map content and according to the format indicated by the ad hoc specification, wherein the virtual map tiles are generated on-demand in response to receiving the request and the ad hoc specification;
(vi) executing the rendering instructions from the rendering specification to transform the spatial and the non-spatial data in the virtual map tiles into the map symbols and the images according to the rendering specification; and
an interface module including instructions that when executed by the processor cause the processor to perform at least transmitting, via network communications, the virtual map tiles to the client device to cause the viewable region of the electronic map to be displayed on the client device.

11. The computing system of claim 10, wherein the map module further comprises instructions configured to cause the one or more processors to perform at least:
fetching the map content from the one or more data sources, wherein the map content includes separate data layers of the virtual map tiles as indicated by the ad hoc specification, wherein the data layers include one or more layers of spatial data and one or more layers of non-spatial data, and wherein fetching the map content includes filtering data from at least one of the data layers to generate refined data as one of the data layers of the electronic map.

12. The computing system of claim 10, wherein the interface module further comprises instructions configured to cause the processor to perform at least:
exposing the interface within the map server to accept real-time requests to the map server that cause the virtual map tiles to be dynamically created according to the ad hoc specification, wherein exposing the interface provides access to a map engine of the map server for computing the virtual map tiles using the ad hoc specification,
wherein the ad hoc specification causes the map engine to generate the virtual map tiles that form the viewable region of the electronic map without using previously cached map tiles.

13. The computing system of claim 10, wherein the map module includes instructions for computing the virtual map tiles of the electronic map by generating the virtual map tiles from a data source that is specified in the ad hoc specification and is remote from the map server, and wherein the interface module includes instructions for transmitting the virtual map tiles to the client device to cause the client device to display the virtual map tiles in a map viewer that originated the request.

14. The computing system of claim 10, wherein the rendering specification further specifies instructions for transforming the map content into the virtual map tiles, and wherein the display specification specifies how to divide the map content into the virtual map tiles.

15. The computing system of claim 10, wherein the interface module further comprises instructions to cause the processor to perform at least:
establishing a connection with the client device over a network to connect the client device with the interface; and
receiving, in the map server, the request that identifies at least a part of the ad hoc specification for defining the virtual map tiles of the viewable region of the electronic map.

16. The computing system of claim 10, wherein the ad hoc specification replaces a standard specification that is defined according to a protocol, and wherein the map module includes instructions for defining the virtual map tiles using the ad hoc specification to compute the virtual map tiles on-demand for each request without using pre-generated map tiles from a cache,
wherein the map module includes instructions for computing the virtual map tiles by rendering raster images as at least one layer of the virtual map tiles and combining the raster images with additional data layers of the map content to form the virtual map tiles, and wherein the additional data layers include spatial data or non-spatial data.

17. A computer-implemented method, the method comprising:
in response to receiving a request for a portion of an electronic map, from a client device through an interface of a map server, parsing, by at least a processor, the request to identify an ad hoc specification as part of the request, wherein the ad hoc specification is a custom specification to the request and includes characteristics of virtual map tiles for forming the portion of the electronic map;
parsing the ad hoc specification identified as part of the request: (i) to identify a display specification that defines map content used to generate virtual map tiles and a format of the virtual map tiles, and (ii) to identify a rendering specification that defines rendering instructions to transform spatial and non-spatial data into map symbols and images to be displayed;

defining virtual map tiles that form a viewable region of the electronic map according to the ad hoc specification including at least the format and the map content identified as part of the request from at least one of the display specification and the rendering specification;

fetching, by the map server, the map content from one or more data sources indicated by the ad hoc specification in the request;

computing and generating, by the map server, the virtual map tiles from at least the fetched map content and according to the format indicated by the ad hoc specification, wherein the virtual map tiles are generated on-demand in response to receiving the request and the ad hoc specification;

executing the rendering instructions from the rendering specification to transform the spatial and the non-spatial data in the virtual map tiles into the map symbols and the images according to the rendering specification; and transmitting, via network communications, the virtual map tiles to the client device to cause the viewable region of the electronic map to be displayed on the client device.

18. The computer-implemented method of claim 17, wherein the fetching further comprising:

fetching the map content including separate data layers of the virtual map tiles as indicated by the ad hoc specification, wherein the data layers include one or more layers of spatial data and one or more layers of non-spatial data, and wherein fetching the map content includes filtering data from at least one of the data layers to generate refined data as one of the data layers of the electronic map.

19. The computer-implemented method of claim 17, further comprising:

exposing the interface within the map server to accept real-time requests to the map server that cause the virtual map tiles to be dynamically created according to the ad hoc specification, wherein exposing the interface provides access to a map engine of the map server for computing the virtual map tiles using the ad hoc specification, wherein the ad hoc specification causes the map engine to generate the virtual map tiles that form the viewable region of the electronic map without using previously cached map tiles.

20. The computer-implemented method of claim 17, wherein the rendering specification specifies instructions for transforming the map content into the virtual map tiles, and wherein the display specification specifies how to divide the map content into the virtual map tiles.

* * * * *